Patented May 7, 1935

2,000,252

UNITED STATES PATENT OFFICE 2,000,252

PRODUCTION OF ACETALS

Walter Reppe and Karl Baur, Ludwigshafen-on-the-Rhine, Germany, assignors to I. G. Farbenindustrie Aktiengesellschaft, Frankfort-on-the-Main, Germany No Drawing. Application January 5, 1931, Serial No. 506,745. In Germany January 23, 1930

14 Claims. (Cl. 260—149)

The present invention relates to the production of acetals.

We have found that valuable products which hitherto could not be prepared or could only be prepared with difficulty are obtained in a simple manner and in excellent yields by adding alcohols containing more than one carbon atom in the molecule and free from carboxylic groups onto vinyl ethers. The term alcohols is meant to include mono- and polyhydric, aliphatic open chain or cycloaliphatic alcohols, aliphatic-aromatic alcohols and phenols free from carboxyl groups. The alcohols must be free from carboxyl groups since otherwise no acetals might be obtained.

The reaction may be accelerated by the addition of small quantities of accelerators especially of acid reacting agents such as mineral acids, halides of mineral acids, acid salts or organic halogen compounds capable of splitting off halogen hydracids, or also neutral salts, if desired at elevated temperatures and/or at a pressure above atmospheric pressure and/or with the addition of inert organic solvents and diluents, such as of the type of ethyl ether or chloroform, or a quantity of the alcohol employed exceeding that required for the reaction.

By adding the alcohols to the vinyl ethers, acetals are obtained; the possibility of forming mixed acetals by this method is especially interesting. The conversion proceeds according to the following general equation:

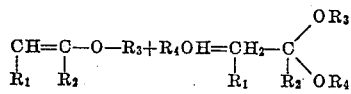

in which $R_1$ and $R_2$ signify alkyl, aryl or aralkyl groups or hydrogen atoms and $R_3$ and $R_4$ signify alkyl, aryl or aralkyl groups.

The reaction may be readily carried out by simply mixing the components, if desired while accelerating it by the addition of small quantities of the aforesaid accelerators. Mineral acids have a very energetic accelerating action, so that the reaction may be easily carried out at temperatures between —30° and +30° C.; if, however, only a very small addition of mineral acid is used, or if less active accelerators such as phenols, in the case of adding on alcohols which are not phenols or salts as for example calcium chloride, are employed, higher temperatures will be necessary both for initiating the reaction and for completing it; in the latter case working in a closed vessel is sometimes necessary on account of high volatility of certain vinyl ethers. In most cases the temperature should not be allowed to rise considerably above 200° C. or even above 100° C.

Since the acetals are all more or less readily hydrolyzed, especially in the presence of aqueous acid agents, their preparation is generally carried out while excluding water as far as possible.

The acetals obtainable according to the present invention are suitable as solvents or softening agents in so far as they have a sufficient stability to the action of water. Some of the acetals are useful for pharmaceutical purposes.

The following examples will further illustrate the nature of this invention, but the invention is not restricted to these examples. The parts are by weight.

Example 1

A very small amount of concentrated sulphuric acid is added to 74 parts of butanol. 72 parts of vinyl-ethyl ether are then allowed to flow in while stirring, the temperature preferably not being allowed to exceed 30° C. After the conversion is completed, the whole is stirred for some time, a little potassium carbonate is added and the liquid is decanted off and distilled. The acetaldehyde-ethyl-normal-butyl acetal corresponding to the formula

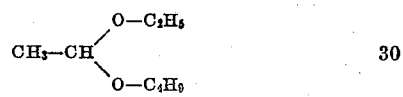

and having a boiling point of from 151° to 152° C. is obtained in a yield of about 60 per cent of the theoretical yield. The same product may also be prepared in the presence of a less active accelerator, such as glacial acetic acid and the like, at higher temperatures and under pressure. It can also readily be obtained by adding ethyl alcohol onto vinyl-normal-butyl ether (obtainable from sodium n-butylate and vinyl chloride) or from normal-butyl (α-chlorethyl)-ether by conversion with sodium alcoholate.

Example 2

80 parts of vinyl-ethyl-ether to which 2 parts of ethyl-(α-chlorethyl)-ether have previously been added, are allowed to drop slowly, while stirring, into a solution of 90 parts of phenol in 50 parts of dry ethyl ether. The reaction temperature is kept at about 15° C. by external cooling. A 10 per cent aqueous solution of caustic soda is then stirred in and the ethereal solution is separated and dried with the aid of calcium chloride. The acetaldehyde-ethyl-phenyl acetal corresponding to the formula

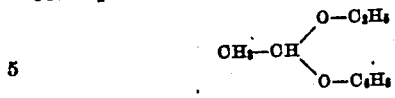

which boils at from 83° to 84° C. at 10.5 millimetres mercury gauge, is obtained in a yield of from 80 to 85 per cent of the theoretical yield.

The same acetal is obtained, but in smaller yields, from anhydrous ethyl alcohol and vinyl-phenyl-ether with the employment of sulphuric acid as the accelerator.

Example 3

80.5 parts of ethylene chlorhydrin are mixed with 50 parts of ethyl ether and 0.5 part of thionyl chloride is added and 75 parts of vinyl ethyl ether are then introduced into the mixture while stirring, the temperature being kept at 15° C. by external cooling with ice and water. After some time from 50 to 100 parts of a 10 per cent aqueous caustic soda solution are stirred into the reaction mixture, the aqueous layer is separated and the remaining solution is dried with the aid of calcium chloride. By distillation in vacuo the mixed acetaldehyde-ethyl-2-chlorethyl-acetal corresponding to the formula

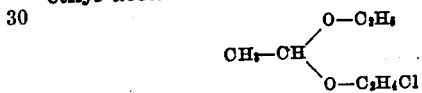

which boils at from 53° to 56° C. at 10 millimetres mercury gauge is obtained in a yield of about 50 per cent of the theoretical yield. If desired, the reaction may be carried out at a higher temperature in a closed pressure-tight vessel in which case, however, the yield of mixed acetal is reduced and higher quantities of acetaldehyde di-ethyl acetal are obtained together with acetaldehyde-di-(2-chlorethyl)-acetal.

Example 4

62 parts of ethylene glycol are slowly added, while stirring to a mixture of 150 parts of vinyl ethyl ether, 50 parts of ethyl-ether and 4 parts of ethyl-(α-chlorethyl)-ether, the reaction mixture being then further worked up as described in the foregoing example. Symmetrical di-(acetaldehyde-ethyl)-1.2-ethylene acetal corresponding to the formula

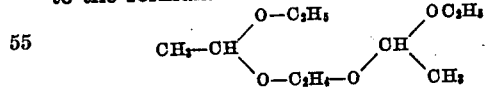

is obtained in a yield of about 50 per cent of the theoretical yield; the said acetal boils at 97° C. at 13 millimetres mercury gauge.

Example 5

12 parts of cholesterol are mixed with 5 parts of ethyl ether and a mixture of 5 parts of vinyl ethyl ether and 0.4 part of ethyl (alpha-chlorethyl) ether is added to the mixture while stirring. The reaction constituents slowly dissolve in each other with a slight evolution of heat. The solution is then dried in vacuo, whereby a product is obtained which gives a lower quantity of precipitate when treated with digitonine than pure cholesterol from which latter the product is differentiated by its considerably higher solubility in ligroin. By a treatment with dilute mineral acids cholesterol is split off from the product which corresponds to the formula

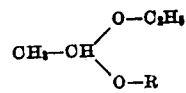

(R=cholesterol).

What we claim is:—

1. The process for the production of acetals, which comprises reacting an alcohol, containing more than one carbon atom in the molecule and free from carboxyl groups, with a vinyl ether while excluding water as far as possible.

2. The process for the production of acetals, which comprises reacting a monohydric alcohol, containing more than one carbon atom in the molecule and free from carboxyl groups, with a vinyl ether while excluding water as far as possible.

3. The process for the production of acetals, which comprises reacting a polyhydric alcohol free from carboxyl groups with a vinyl ether.

4. The process for the production of acetals which comprises reacting a phenol free from carboxyl groups with a vinyl ether while excluding water as far as possible.

5. The process for the production of acetals, which comprises reacting an alcohol containing more than one carbon atom in the molecule and free from carboxyl groups with a vinyl ether in the presence of a small quantity of an accelerator.

6. The process for the production of acetals, which comprises reacting an alcohol containing more than one carbon atom in the molecule and free from carboxyl groups with a vinyl ether while heating and at a pressure above atmospheric pressure but while excluding water as far as possible.

7. The process for the production of acetals, which comprises reacting an alcohol containing more than one carbon atom in the molecule and free from carboxyl groups with a vinyl ether in the presence of an inert organic solvent while excluding water as far as possible.

8. The process for the production of acetals, which comprises reacting an alcohol containing more than one carbon atom in the molecule and free from carboxyl groups with a vinyl ether, while heating in the presence of a small quantity of an acid reacting substance while excluding water as far as possible.

9. As new articles of manufacture ethylidine acetals corresponding to the general formula

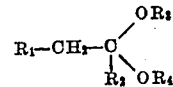

in which $R_1$ and $R_2$ denote hydrogen or alkyl, aryl or aralkyl groups and $R_3$ and $R_4$ denote hydrocarbon radicles of the alkyl, aryl or aralkyl series different from each other and at least one of which contains more than 5 carbon atoms.

10. The process for the production of acetals which comprises reacting an alcohol, containing more than one carbon atom in the molecule and free from carboxyl groups, with a vinyl ether at a temperature between —30° and about 100° C., while excluding water as far as possible.

11. The process for the production of acetals which comprises reacting an alcohol, containing more than one carbon atom in the molecule and free from carboxyl groups, with a vinyl ether at a temperature between about 15° and about 30° C., while excluding water as far as possible.

12. The process for the production of acetals which comprises reacting an alcohol, containing more than one carbon atom in the molecule and free from carboxyl groups, with vinylethyl ether, while excluding water as far as possible.

13. The process for the production of acetals which comprises reacting an aliphatic monohydric alcohol, containing more than one carbon atom in the molecule and free from carboxyl groups, with a vinyl ether, while excluding water as far as possible.

14. The process for the production of acetals which comprises reacting an aliphatic monohydric alcohol, containing more than one carbon atom in the molecule and free from carboxyl groups, with vinylethyl ether, while excluding water as far as possible.

WALTER REPPE.
KARL BAUR.